United States Patent
Robbin et al.

(10) Patent No.: US 10,926,819 B2
(45) Date of Patent: Feb. 23, 2021

(54) METHOD AND VEHICLE FOR CONVEYING AN ELECTRICALLY DRIVEN MOTOR VEHICLE DURING ASSEMBLY THEREOF

(71) Applicant: EISENMANN SE, Böblingen (DE)

(72) Inventors: Jörg Robbin, Ammerbuch (DE); Gernot Herwig, Holzgerlingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 16/498,489

(22) PCT Filed: Feb. 15, 2018

(86) PCT No.: PCT/EP2018/053822
§ 371 (c)(1),
(2) Date: Sep. 27, 2019

(87) PCT Pub. No.: WO2018/177650
PCT Pub. Date: Oct. 4, 2018

(65) Prior Publication Data
US 2020/0385075 A1    Dec. 10, 2020

(30) Foreign Application Priority Data
Mar. 29, 2017   (DE) .................... 10 2017 106 731.0

(51) Int. Cl.
*B62D 65/18*    (2006.01)
*B60L 53/14*    (2019.01)
*B60L 58/20*    (2019.01)

(52) U.S. Cl.
CPC .............. *B62D 65/18* (2013.01); *B60L 53/14* (2019.02); *B60L 58/20* (2019.02); *B60L 2200/26* (2013.01);
(Continued)

(58) Field of Classification Search
CPC .... B23D 21/004; B62D 65/18; B62D 65/022; B60L 53/14; B60L 58/20; B60L 2200/44;
(Continued)

(56) References Cited

U.S. PATENT DOCUMENTS 4,941,407 A * 7/1990 Pigott .................... B62D 65/18
104/289
4,966,080 A   10/1990 Teissler et al.
(Continued)

FOREIGN PATENT DOCUMENTS

DE           40 20 286    10/1994
DE      10 2005 034 582    2/2007
(Continued)

OTHER PUBLICATIONS

Youtube:BMW I3 production—Leipzig.Jul. 12, 2016. Quelle (https://www.youtube.com/watch?v=HGi-KmYGuZE).

*Primary Examiner* — James R Bidwell
(74) *Attorney, Agent, or Firm* — Schroeder Intellectual Property Law Group, LLC

(57) ABSTRACT

A conveying method, wherein a conveying vehicle conveys an electrically driven motor vehicle during assembly thereof. In this method, the conveying vehicle uses energy which is stored in a traction battery of the motor vehicle. For this purpose, the conveying vehicle has an electrical interface which is connected to the traction battery of the motor vehicle, and a converter. This lowers an electrical voltage provided by the traction battery via the electrical interface to a value suitable for the conveying vehicle. The energy drawn by the traction battery can be used above all for the particular drive of the conveying vehicle and/or for other electrical loads of the conveying vehicle. As a result, an on-board battery for the conveying vehicle can have much smaller dimensions or can even be omitted completely.

10 Claims, 3 Drawing Sheets

(52) U.S. Cl.
CPC ..... *B60L 2200/44* (2013.01); *B60L 2240/547* (2013.01)

(58) Field of Classification Search
CPC . B60L 2240/547; B60L 11/18; B60L 11/1801
See application file for complete search history.

(56) References Cited

U.S. PATENT DOCUMENTS

| | | |
|---|---|---|
| 10,435,095 B2* | 10/2019 | Herwig .................. B65G 17/34 |
| 2008/0276827 A1 | 11/2008 | Roeckle et al. |
| 2019/0233037 A1* | 8/2019 | Riegraf .................. F26B 25/02 |
| 2020/0114384 A1* | 4/2020 | Schwab .............. B05B 13/0452 |
| 2020/0130115 A1 | 4/2020 | Vetter et al. |

FOREIGN PATENT DOCUMENTS

| | | |
|---|---|---|
| DE | 10 2012 016 519 | 2/2014 |
| DE | 10 2017 103 931 | 8/2018 |
| EP | 0 285 527 | 10/1988 |
| WO | 2005/014375 | 2/2005 |

* cited by examiner

METHOD AND VEHICLE FOR CONVEYING AN ELECTRICALLY DRIVEN MOTOR VEHICLE DURING ASSEMBLY THEREOF

RELATED APPLICATIONS

This application is a national phase of International Patent Application No. PCT/EP2018/053822 filed Feb. 15, 2018, which claims priority to German Patent Application No. 10 2017 106 731.0 filed Mar. 29, 2017—the contents of both of which are incorporated herein by reference.

BACKGROUND OF THE INVENTION

1. Field of the Invention

The invention relates to a method and a vehicle for conveying an electrically driven motor vehicle, in particular a passenger car or a lorry, during its assembly. The conveying vehicle can, for example, be an automated guided transport vehicle, an assembly platform with its own drive or a vehicle of an overhead track system.

2. Description of Prior Art

During the assembly of motor vehicles in production plants, conveyor systems are used which have the task of conveying the motor vehicles between successive processing stations. In the case of motor vehicles, for example, axles, drive shafts, shock absorbers, brakes and other parts are assembled in various processing stations to form a chassis. In other processing stations, electrical wiring harnesses and interior equipment are installed in the painted body. Even after combining the chassis with the body, often referred to as "marriage", many other assembly steps still have to be performed in the processing stations, e.g. the attachment of doors and flaps. The motor vehicle in the assembly is thereby sometimes moved several times between different conveyor systems.

The choice of the conveyor system depends, among other things, on the type of assembly steps to be performed and on the progress of the assembly. Conveying vehicles having an assembly platform that can be walked on by workers are used mainly for assembly steps that are to be performed manually by workers. In most cases, conveying vehicles with walk-on assembly platforms do not have their own drive, but rather form a pushed unit during conveyance, the pushed unit being driven by external friction wheels engaging laterally. Meanwhile, conveying vehicles with walk-on assembly platforms that have their own drive are also known. Such conveying vehicles are described, for example, in DE 40 20 286 C2 and DE 10 2005 034 582 A1.

Automated guided vehicle systems (AGV) comprising several automated guided transport vehicles, a master control as well as devices for position detection of the transport vehicles and for communication between the transport vehicles and the master control, are also known for the transport of motor vehicles during assembly.

A conveyor system is known from DE 2017 103 931 A1, in which conveyor system such automated guided transport vehicles are additionally equipped with a walk-on assembly platform and can individually travel different sequences of processing stations.

Rail-mounted conveyor systems, which can also be designed as an overhead track, are also widely used.

Since motor vehicles generally have a heavy weight, the conveying vehicles used to transport the motor vehicles during assembly must also be of solid construction. Although the conveying speeds are low, the heavily loaded conveying vehicles require a lot of drive energy. Since the use of internal combustion engines in assembly halls is not possible, the conveying vehicles are usually driven by electric motors. In the case of track-mounted conveying vehicles, the electricity is often supplied via sliding contacts which abut conductor lines. These can be laid in the floor or run along a support rail. Non-track-mounted conveying vehicles, on the other hand, are usually equipped with their own battery, which has to be charged on a regular basis.

The transmission of electricity via conductor lines in track-mounted conveyor systems is however associated with a high installation effort. In the case of non-track-mounted conveying vehicles, carrying batteries is also associated with disadvantages because the batteries are expensive and heavy and also limit the availability of the conveying vehicles due to the necessary charging processes.

The same problems also arise when conveying electrically driven motor vehicles during assembly. Since traction batteries are in some instances heavier than combustion engines, the energy supply of the conveying vehicles with electrical energy has also not yet been satisfactorily solved when conveying electrically driven motor vehicles.

SUMMARY OF THE INVENTION

The object of the invention is to improve the conveyance of an electrically driven motor vehicle during its assembly with the aim of reducing costs and increasing efficiency.

According to the invention, this object is solved by a conveying method, in which a conveying vehicle conveys an electrically driven motor vehicle during assembly of the motor vehicle. According to the invention, the conveying vehicle uses energy which is stored in a traction battery of the motor vehicle.

Thus, instead of using conveying vehicles that have their own large and heavy battery, the conveying vehicle according to the invention uses the existing traction battery of the motor vehicle to be conveyed. The conveying vehicle therefore does not need its own battery or only needs a comparatively small battery. Alternatively, the conveying vehicle can retain its own battery of the previous size. However, this battery has to be charged substantially less frequently, which considerably increases the availability of the conveying vehicle.

In the case of track-mounted conveying vehicles, which are often not equipped with their own battery, an energy supply via sliding contacts and conductor lines can be completely dispensed with. This leads to considerable savings in installation costs. In this case too, however, it is usually appropriate to provide small batteries on the conveying vehicles.

In in context at hand, a 'motor vehicle' is understood as any component assembly which is already equipped with a traction battery and which, in the course of assembly, is supplemented to form a complete and functional motor vehicle.

It is particularly preferred if the conveying vehicle has its own electric drive and uses the energy stored in the traction battery of the motor vehicle to supply the drive. A smaller battery carried by the conveying vehicle is then only needed to also be mobile during the relatively short periods when the conveying vehicle does not convey an electrically driven motor vehicle.

The electrical energy stored in the traction battery can, however, be used additionally or alternatively for purposes other than driving the conveying vehicle. Energy consumers that can be considered are, for example, auxiliary components of the conveying vehicle that serve for navigation, control or communication with a higher-level system control, as well as lift tables or other moving devices with which the vehicle can be raised, rotated or moved in any other way relative to a chassis of the conveying vehicle. If the conveying vehicle has an assembly platform which can be walked on by workers, a tool employed by the workers on the assembly platform can also use the energy stored in the traction battery of the motor vehicle. However, since the drive of the conveying vehicle usually consumes significantly more electrical energy than these auxiliary components or tools, the advantages achieved by the invention are particularly significant when using the traction battery of the conveyed motor vehicle for the electrical drive.

Particularly when the conveying vehicle is an automated guided transport vehicle that can individually travel different sequences of processing stations, the supply of electrical energy via conductor lines or induction requires a lot of effort or is even impossible. The use of the traction battery of the conveyed motor vehicle is then particularly advantageous. Such automated guided transport vehicles can have an omnidirectional drive with which the transport vehicle can move in any direction from a standstill.

The use of the electrical energy stored in the traction battery by the conveying vehicle can begin at a time before the traction battery is installed in a body of the motor vehicle. The earlier the use of the traction battery by the conveying vehicle begins, the smaller the battery to be kept in the conveying vehicle can be dimensioned if independent movements are to be possible even when no motor vehicle is currently being conveyed.

The subject matter of the invention is also a conveying vehicle for conveying an electrically driven motor vehicle during assembly of the motor vehicle. According to the invention, the conveying vehicle is configured to use energy stored in a traction battery of the motor vehicle. For this purpose, the conveying vehicle comprises an electrical interface configured to be connected to the traction battery of the motor vehicle. In addition, the conveying vehicle is equipped with an adapting unit configured to adapt an electric voltage provided by the traction battery to an on-board electrical system of the conveying vehicle. The advantages and further considerations described in relation to the method apply accordingly.

The electrical interface can, for example, be a socket into which a power cable can be plugged that will be connected to the traction battery. However, a wireless transmission of electrical energy via induction or a plug that engages directly in a socket formed on the traction battery as soon as the traction battery is mounted is also considered.

The adapting unit is necessary because it is usually not possible to connect the traction battery directly to the on-board electrical system of the conveying vehicle. To do this, it must first be ensured that the electrical parameters (voltage, frequency) of the on-board electrical system are brought into line with those of the traction battery.

The adapting unit will usually comprise a power converter configured to reduce an electric voltage provided by the traction battery via the electrical interface. A reduction of the voltage by means of a power converter is usually necessary because the traction batteries of motor vehicles generate a direct current voltage which is usually in the order of several hundred volts. For safety reasons, on the other hand, the conveying vehicles may only be operated with a significantly lower voltage, e.g. 24 volts or 48 volts. If the conveying vehicle requires direct current, the power converter can be a direct current converter. If, on the other hand, the conveying vehicle requires alternating current, an alternating current converter must be used as the power converter.

BRIEF DESCRIPTION OF THE DRAWINGS

In the following, embodiments of the invention are explained in more detail with the aid of the drawings.

DESCRIPTION OF PREFERRED EMBODIMENTS

1. First Embodiment

Figure 1:
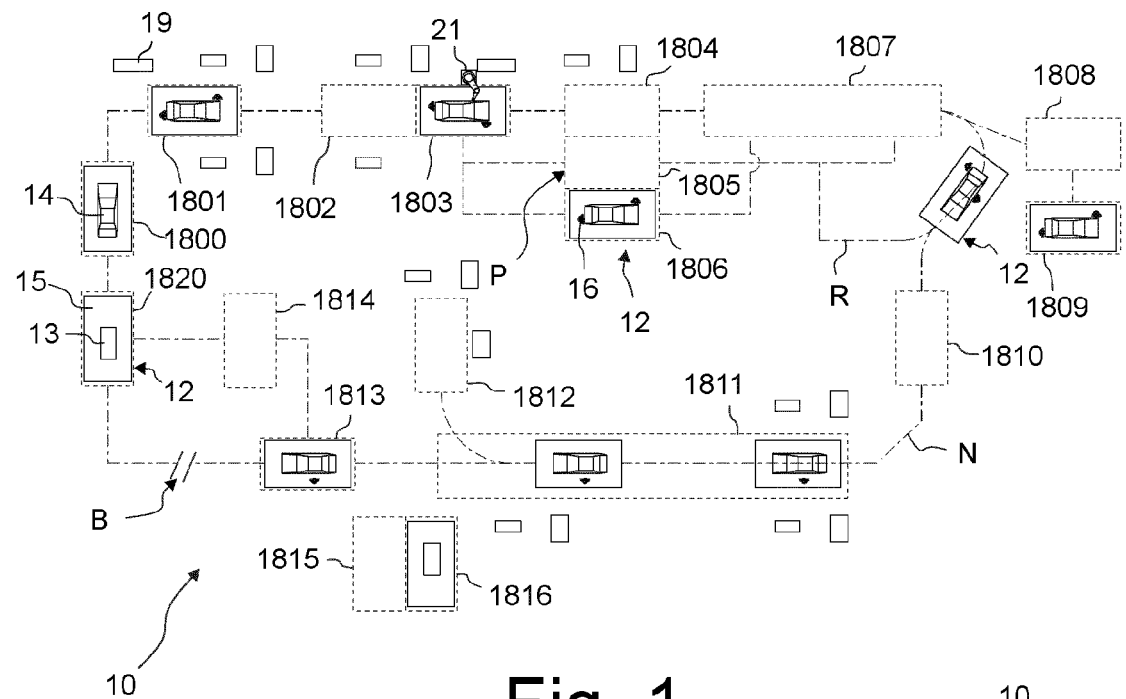
FIG. 1 shows a conveyor system for conveying motor vehicles, in which several conveying vehicles travel independently of each other between processing stations.

FIG. 1 shows in a schematic top view a conveyor system 10 according to the invention according to a first embodiment. The conveyor system 10 comprises several automated guided transport vehicles 12, each of which comprises a support 13 for motor vehicles 14 to be conveyed and an assembly platform 15, which can be walked on by workers 16. In the embodiment shown, the transport vehicles 12 travel freely in a travel path network N, in which they orient themselves with the aid of navigation devices such as radio-based navigation systems, laser scanners, cameras or ultrasonic sensors. The transport vehicles 12 can thereby individually approach different sequences of processing stations 1801 to 1816. Rectangles 19 in FIG. 1 indicate storage containers for parts to be mounted or other materials.

In a receiving station 1800, the transport vehicles 12 are loaded with the motor vehicles 14 still to be assembled to completion. The processing stations 1801 to 1816 are partly arranged one behind the other, partly parallel to each other and do not have to be approached by all transport vehicles 12.

In the case of the conveyor system shown in FIG. 1, it is assumed that the workers 16 walk on the transport vehicle 12 only after it has received a motor vehicle 14 in the receiving station 1800 and reached the first processing station 1801. The transport vehicle 12 remains stationary in this first processing station 1801 until the processing provided there has been completed. The workers 16 can signal this by means of an input device on the transport vehicle 12. Alternatively, a fixed cycle can also be predetermined for this, at the end of which the vehicle 12 moves out of the first processing station 1801. The workers 16 can now remain on the transport vehicle 12 and continue the processing while it advances to the next processing station 1802.

In the third processing station 1803, a robot 21 supports the processing. The third processing station 1803 is located at the entrance of a parallel area P, which comprises three processing stations 1804, 1805 and 1806 parallel to one another. In these processing stations, processing steps which are not required for all motor vehicles 14 are performed. To approach the processing stations 1805, 1806, the transport vehicle 12 can be moved laterally by a specified distance.

Several transport vehicles 12 can travel into the subsequent processing station 1807 and be processed simultaneously. There, during processing, they can either continue their travel at slow speed or stop at a suitable position. If the processing of a motor vehicle 14 in a processing station takes an unexpected long time, the transport vehicle 12, which transports the motor vehicle 14 concerned, can leave the processing area 1807 and be supplied to the processing area 1807 anew via a return path R. As a result, transport vehicles 12 do not have to wait for the completion of the processing of a motor vehicle 14, which is transported by a preceding transport vehicle 12.

On the right in FIG. 1, two processing stations 1808, 1809 are visible, which serve for post-processing. These processing stations 1808, 1809 are only approached by such transport vehicles 12, for which the workers 16 have identified that the motor vehicle 14 transported by it has a defect.

The subsequent processing stations 1810 and 1811 are again approached by all transport vehicles 12. The processing station 1812, on the other hand, is only approached by certain transport vehicles 12 and is left backwards again after the processing.

This is followed by the processing station 1813, from which the transport vehicles 12 travel either directly or via a further processing station 1814 to a delivery station 1820, in which the motor vehicle 14 is removed.

Two oblique lines in FIG. 1 indicate a blockade B located on the direct path between the processing station 1813 and the delivery station 1820. Transport vehicles 12 therefore cannot use this part of the travel path network N. For this reason, all transport vehicles 12 are exceptionally guided via the processing station 1814.

Below in FIG. 1, two further processing stations 1815 and 1816 are indicated. However, these processing stations are not used for processing motor vehicles 14, but rather represent repair stations for the transport vehicles 12.

Figure 2:
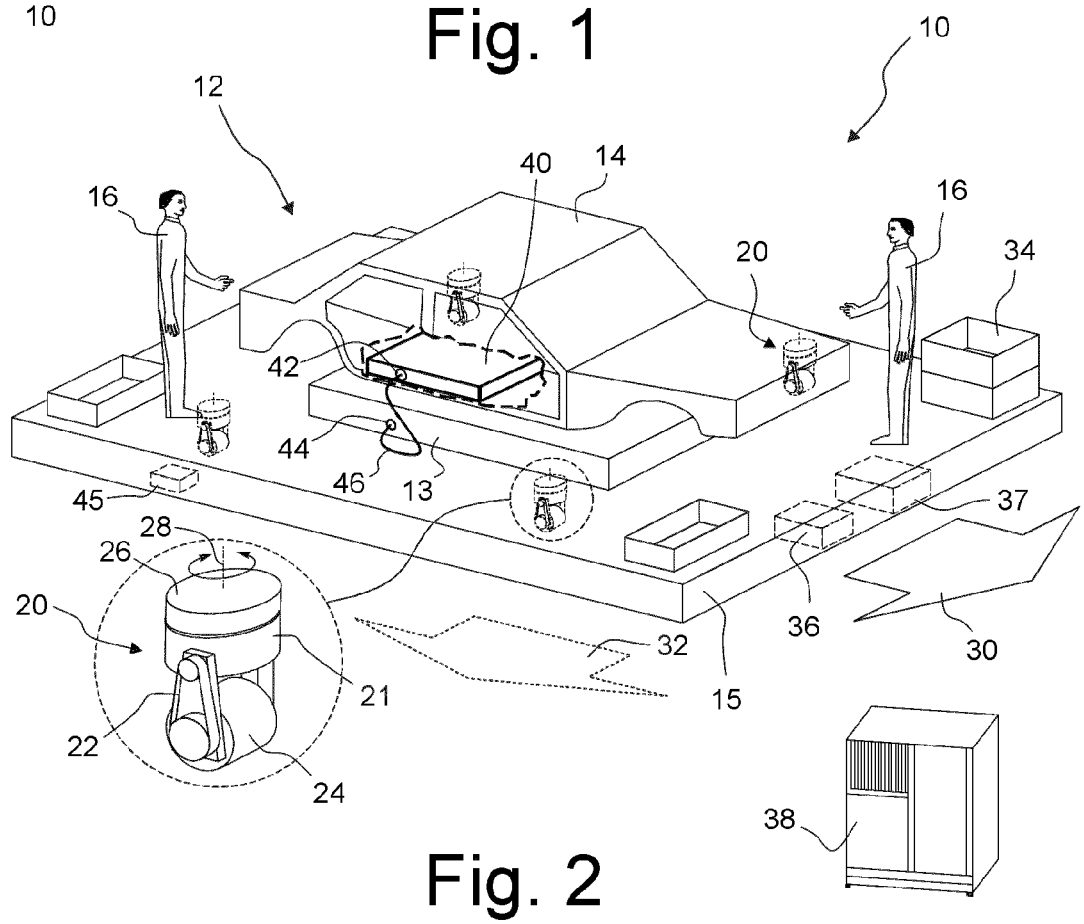
FIG. 2 shows a perspective illustration of a conveying vehicle according to the invention for conveying motor vehicles according to a first embodiment, in which the conveying vehicle has an assembly platform which can be walked on by workers.

FIG. 2 shows in a perspective illustration a single transport vehicle 12 which is part of the conveyor system 10 shown in FIG. 1. The transport vehicle 12 is equipped with its own omnidirectional drive, which comprises four drive-turn modules 20 in the embodiment shown. As can be seen in the enlarged illustration, each drive-turn module 20 comprises a motor unit 21 and a drive wheel 24 driven by a belt 22, which together form a drive unit. This drive unit can be rotated relative to a support 26 around a vertical axis 28, as is known in Prior Art. To rotate the drive unit about the vertical axis 28, a further motor is provided, which is not shown in FIG. 2. The drive-turn modules 20 are embedded in the assembly platform 15 such that only the drive wheels 24 protrude downwards.

If the drive units of all drive-turn modules 20 are in the rotational position shown in FIG. 2 with respect to their vertical axis 28, then the transport vehicle 12 moves along its longitudinal direction when the drive wheels 24 are turned, as indicated by an arrow 30. If the drive units are all rotated by 90° with respect to their vertical axis 28, the transport vehicle 12 can move perpendicularly to its longitudinal direction 30 from a standstill, i.e. without prior cornering, as indicated by a dotted arrow 32 in FIG. 2. By controlling the drive-turn modules 20 accordingly, diagonal travelling or rotations on the spot can also be realized.

On the top side of the assembly platform 15 there are several containers 34 in which the parts to be assembled, other materials or tools are kept ready, which the workers 16 need for the processing.

A control unit 36, which communicates wirelessly with a central control device 38 of the conveyor system 10, is integrated in the assembly platform 15. The control unit 36 comprises a navigation system, with which the transport vehicle 12 can orient itself in a production hall, and a collision avoidance device. Control units 36 with these functions are known in and of themselves from automated guided transport vehicle systems (AGV), which is why this will not be explained in further detail at this point. The transport vehicle 12 is thus able to move freely between processing stations in a production hall. Preferably, the transport vehicle 12 is not bound to a predetermined track during such travelling. In principle, however, controls are also considered in which the transport vehicles 12 move along predetermined travel paths, which can be predetermined by conductive lines laid in the ground or similar.

A battery 37 is also integrated in the assembly platform 15, which is, however, small and light compared to conventional free-moving transport vehicles and therefore has a comparatively low capacity. The battery supplies the drive of the transport vehicle 12 and all other electrical consumers with electrical energy.

The support 13 of the transport vehicle 12 carries a motor vehicle 14 to be assembled, which is electrically driven. In the embodiment shown, the body of the motor vehicle 14 mounted on the support 13 is not yet placed on a chassis. However, the traction battery 40 of the motor vehicle 14 is already located in the area of a floor plate of the body.

In the embodiment shown, the traction battery 40 is a lithium-ion accumulator that generates a direct current voltage of about 360 V and has a capacity of about 30 kWh. The traction battery 40, which was charged before it was installed in the body of the motor vehicle 14, is equipped with a special connection socket 42, which is not provided for the connection to the electric drive motor of the motor vehicle 14. An electrical interface 44, which is also designed as a connection socket here, is provided on the support 13.

After placing the motor vehicle 14 on the transport vehicle 12 in the receiving station 1800, a worker 16 connects the connection socket 42 of the traction battery 40 to the electrical interface 44 of the transport vehicle 12 with the aid of a connection cable 46. The control unit 36 of the transport vehicle 12 is programmed such that it detects the voltage applied to the electrical interface 44 and generated by the traction battery 40. With the aid of a relay switch, all electrical consumers are now disconnected from their own battery 37 and connected to the traction battery 40 instead. From now on, the drive and all other electrical consumers of the transport vehicle 12 no longer draw the required electrical energy from their own battery 37, but rather from the traction battery 40 of the motor vehicle 14. Their own battery 37 is therefore no longer used during the entire travel until the motor vehicle 14 is removed in the delivery station 1820. Of course, it is also possible to not completely disconnect their own battery 37 from the on-board electrical system of the transport vehicle 12, but to continue using it in part.

The other electrical consumers can, for example, be the control device 36 and the sensors and communication devices associated therewith. The transport platform 15 can also carry screwdrivers and other tools that also require electrical energy and can now draw it from the traction battery 40. In addition, transport vehicles 12 are often equipped with moving devices such as lift tables, which also require electrical energy.

Since the transport vehicle 12 may only be operated with low voltages of less than 120 volts for safety reasons, it is equipped with a direct current converter 45 which reduces the direct current voltage supplied by the traction battery 40 to a lower value, e.g. 48 volts or 96 volts. If the transport vehicle 12 has an on-board electrical system which is operated with an alternating current voltage, a conversion from direct current voltage to alternating current voltage with the specified frequency is required instead.

3. Further Embodiments

Figure 3:
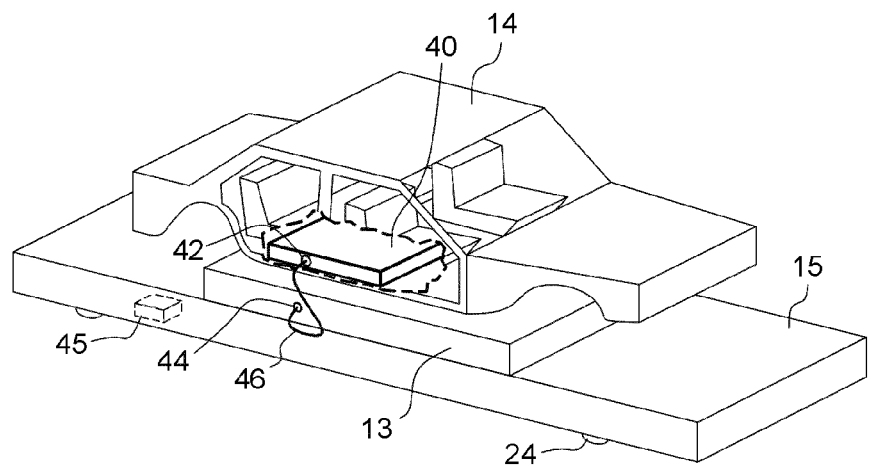
FIG. 3 shows a perspective illustration of a conveying vehicle according to the invention for conveying motor vehicles according to a second embodiment, in which the conveying vehicle does not have an assembly platform which can be walked on by workers.

FIG. 3 shows a transport vehicle 12 according to a second embodiment in which the assembly platform 15 cannot be walked on by workers. Such transport vehicles can mainly be used for the transport of motor vehicles to be assembled between more distant areas in the production hall or between production halls. In addition, the transport vehicle 12 shown in FIG. 3 is not equipped with its own battery. Therefore, the transport vehicle 12 cannot move independently without the motor vehicle 14, but rather is pulled or pushed during this time by an external pulling or pushing device.

Figure 4:
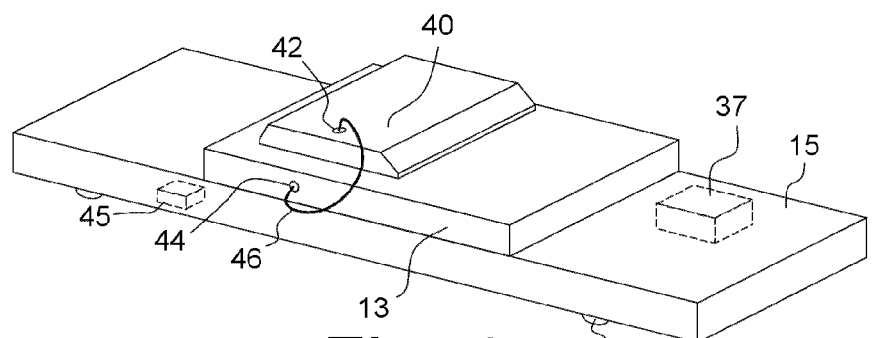
FIG. 4 shows a perspective illustration of a conveying vehicle according to the invention for conveying motor vehicles according to a third embodiment, in which the conveying vehicle initially only conveys a traction battery of the motor vehicle.

FIG. 4 shows a transport vehicle 12 according to a third embodiment, in which the support 13 is configured to initially receive only the traction battery 40. In this state, the traction battery 40 can already be connected to the transport vehicle 12 with the aid of the connection cable 46, as shown in FIG. 4.

Figure 5:
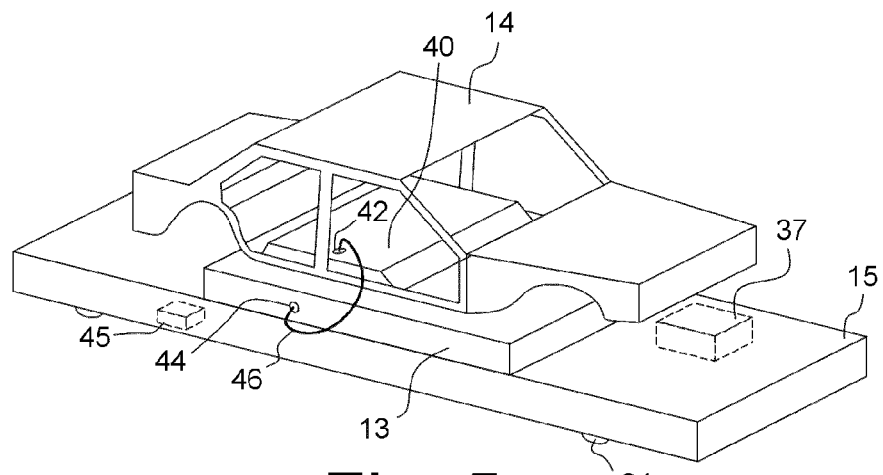
FIG. 5 shows the conveying vehicle shown in FIG. 4 after assembly of the body of the motor vehicle.

Later, when the body of the motor vehicle 14 is placed on top (see FIG. 5), it may be necessary to briefly interrupt the electrical connection between the traction battery 40 and the transport vehicle 12 in order to be able to pass the connecting cable 46 through an opening in the body.

In addition to a connection established manually with the aid of a connection cable 46, plug connectors on the battery 40 and the transport vehicle 12 are also considered, with which an electrical connection can automatically be established when the traction battery 40 is placed on the support 13.

Figure 6:
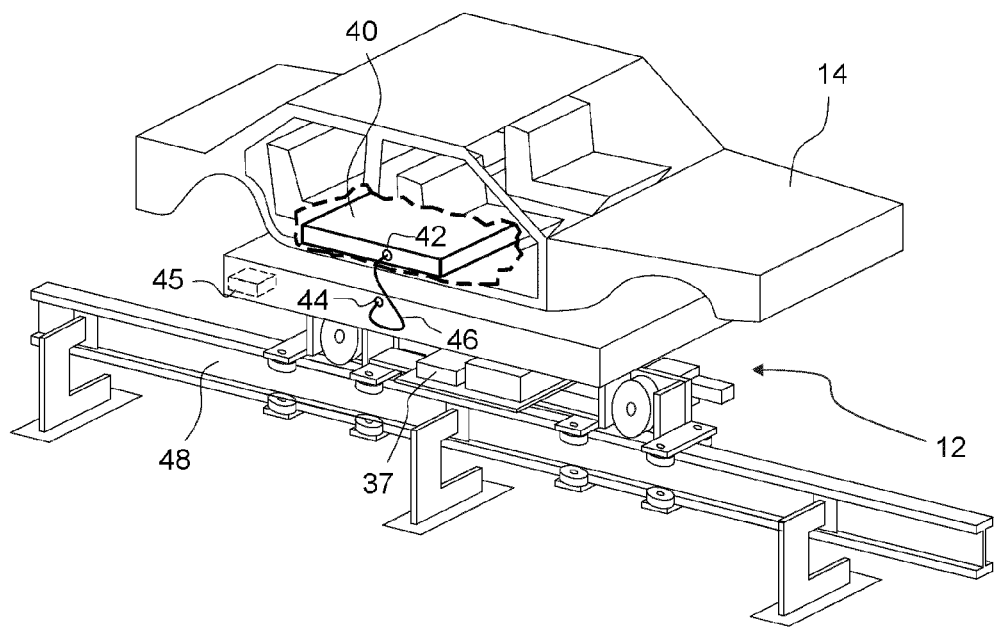
FIG. 6 shows a perspective illustration of a conveying vehicle according to the invention for conveying motor vehicles according to a fourth embodiment, in which the conveying vehicle is part of a monorail track system.

FIG. 6 shows a track-mounted conveying vehicle 12 according to a fourth embodiment, which is part of a monorail conveyor system. In the embodiment shown, the conveying vehicle 12 is also equipped with a small battery, however not with sliding contacts, and conductor lines, which with the sliding contacts enable an electricity supply, are also not provided on a transport rail 48.

Here, too, the conveying vehicle 12 makes shorter empty runs using its own battery 37. Once a motor vehicle 14 with a traction battery 40 already mounted in it has been placed on top, an electrical connection is established between the traction battery 40 and the conveying vehicle 12 with the aid of a connection cable 46, as in the case of the embodiment described above. From now on, the drives and all other electrical consumers of the conveying vehicle 12 will exclusively use the traction battery 40 of the motor vehicle 14 as an energy source.

Figure 7:
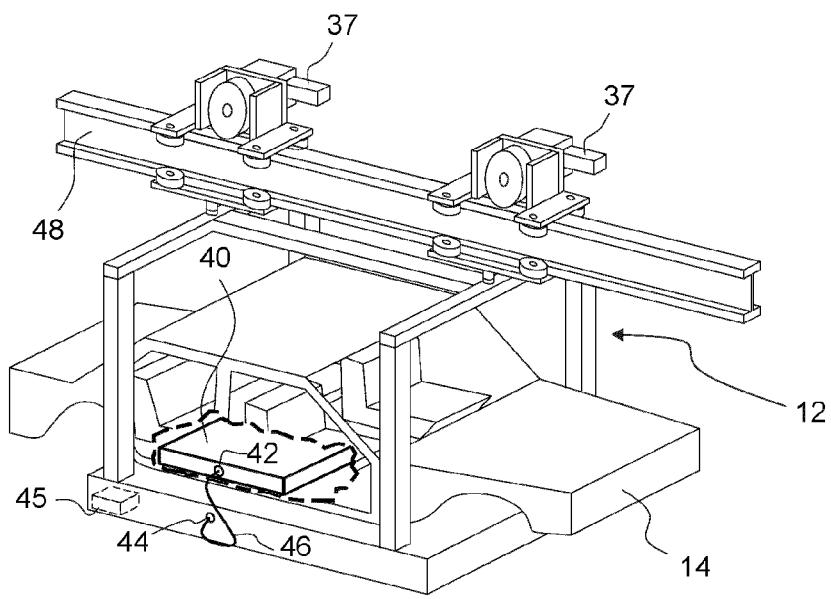
FIG. 7 shows a perspective illustration of a conveying vehicle according to the invention for conveying motor vehicles according to a fifth embodiment, in which the conveying vehicle is part of a railed overhead track system.

FIG. 7 shows a conveying vehicle 12 according to a fifth embodiment, which differs from the embodiment shown in FIG. 6 only in that the conveyor system is an electric overhead track in which the conveying vehicles 12 are mounted to a transport rail 48 in a suspended fashion.

What is claimed is:

1. A conveying method comprising:
Conveying an electrically driven motor vehicle with a conveying vehicle during assembly of the electrically driven motor vehicle, wherein the conveying vehicle uses energy which is stored in a traction battery of the electrically driven motor vehicle.

2. The method according to claim 1, wherein the conveying vehicle has its own electric drive and uses the energy stored in the traction battery of the electrically driven motor vehicle to supply the drive.

3. The method according to claim 2, wherein the conveying vehicle is an automated guided transport vehicle.

4. The method according to claim 3, wherein the automated guided transport vehicle individually travels different sequences of processing stations.

5. The method according to claim 1, wherein the conveying vehicle has an assembly platform which can be walked on by workers and in that a tool employed by the workers on the assembly platform uses the energy stored in the traction battery of the electrically driven motor vehicle.

6. The method according to claim 1, wherein the conveying vehicle is electrically connected to the traction battery at a time before the traction battery is installed in a body of the electrically driven motor vehicle.

7. The method according to claim 1, wherein the conveying vehicle is electrically connected to a terminal of the traction battery which is not provided for the connection to an electric motor of the electrically driven motor vehicle.

8. A conveying vehicle for conveying an electrically driven motor vehicle during assembly of the motor vehicle, comprising:
an electrical interface configured to be connected to a traction battery of an electrically driven motor vehicle, and
an adapting unit configured to adapt an electric voltage provided by the traction battery to an on-board electrical system of the conveying vehicle,
wherein the conveying vehicle is configured to use energy stored in the traction battery of the electrically driven motor vehicle.

9. The conveying vehicle according to claim 8, wherein the adapting unit comprises a power converter configured to reduce an electric voltage provided by the traction battery via the electrical interface.

10. The conveying vehicle according to claim 8, wherein the conveying vehicle has its own electric drive and uses the energy stored in the traction battery of the electrically driven motor vehicle to supply the drive.

\* \* \* \* \*